D. R. McCUTCHEN.
EGG TESTER.

No. 187,475. Patented Feb. 20, 1877.

WITNESSES
Nat. E. Oliphant
Rich. F. Wagner

INVENTOR
David R. McCutchen,
per Chas. H. Fowler,
Attorney.

UNITED STATES PATENT OFFICE.

DAVID R. McCUTCHEN, OF CHATSWORTH, ILLINOIS.

IMPROVEMENT IN EGG-TESTERS.

Specification forming part of Letters Patent No. 187,475, dated February 20, 1877; application filed January 22, 1877.

*To all whom it may concern:*

Be it known that I, DAVID R. McCUTCHEN, of Chatsworth, in the county of Livingston and State of Illinois, have invented a new and valuable Improvement in Egg-Testers; and I do hereby declare that the following is a full, clear, and exact description of the construction and operation of the same, reference being had to the annexed drawings, making a part of this specification, and to the letters and figures of reference marked thereon.

Figure 1:
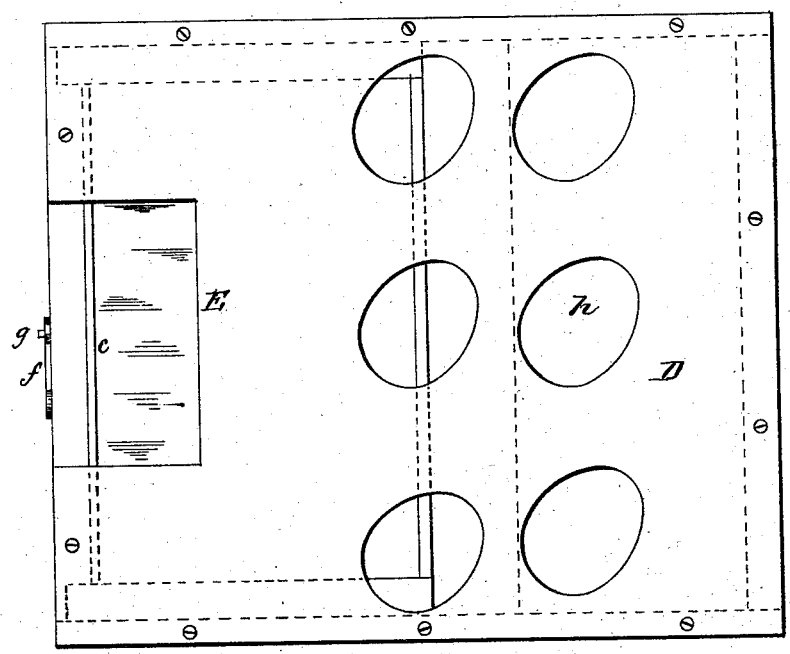
Figure 2:
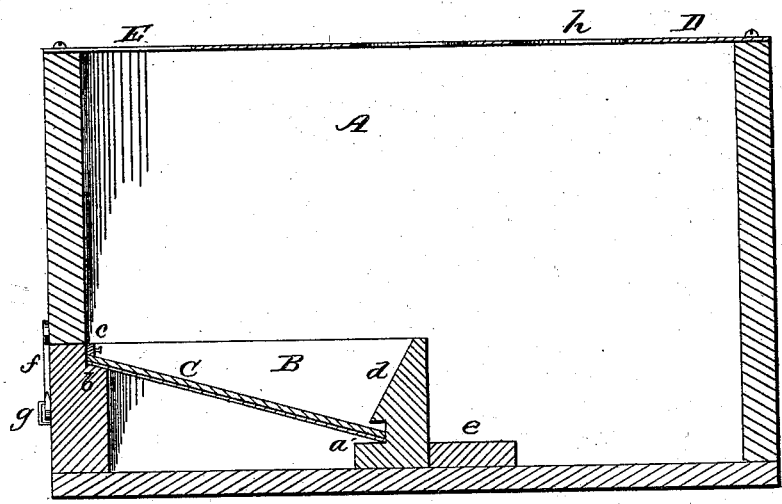

Figure 1 of the drawings is a representation of a top-plan view of my invention. Fig. 2 is a vertical longitudinal section of the same.

This invention has relation to devices for testing eggs, and the object and purpose thereof is to produce a device of this class simple in its construction and effective in its purpose; and the invention consists in the combination and arrangement of the several parts, as will be hereinafter described, and subsequently pointed out in the claims.

In the accompanying drawings, A represents a box, of any suitable size and shape, the front end, at the bottom thereof, being cut away, through which is inserted a frame, B, with a mirror, C, so that the frame, with the mirror, can be removed for cleaning; or, if by accident the mirror should become broken, it may be readily removed from the frame and another substituted in its place. To make provision for the ready removal of said mirror the frame B has a longitudinal slot, *a*, formed therein, in which is inserted or rests the lower edge of the mirror, the upper edge resting upon a shoulder, *b*, of the frame, the glass being kept in position by a clamping plate or bar, *c*.

It will be noticed that the mirror is arranged at an angle, so as to reflect the eggs thereon, and thus avoid having the mirror extend over the entire surface of the box A.

The rear end of the frame B has an inclined surface, *d*, which tends to increase the reflecting powers of the mirror. To prevent the frame B from extending too far into the box, a stop, *e*, is secured to the bottom, and extends the entire width thereof, the frame being held in place by a suitable hook, *f*, and staple *g*. The upper part or top of the box A is open, and has resting upon the ends and sides of the same a table, D, said table having any number of suitable orifices, *h*, for the reception of the eggs, and an opening, E, to allow the person to inspect the eggs by the reflection of their image upon the mirror, the image appearing as a dark spot when the egg is spoiled, and as a bright spot when the egg is sound.

The table D may be lined with a soft material, so that a cushion will be formed around the orifices *h*, to prevent the light from entering except through the opening E.

Having now fully described my invention, what I claim as new, and desire to secure by Letters Patent, is—

1. An egg-tester consisting of the box A, table D, having the openings *h*, and the removable frame B, having the mirror C, said frame, with its mirror, being inserted in or drawn from the box through an opening at its end, substantially as and for the purpose set forth.

2. The frame B, with the inclined surface *d* and inclined mirror C, substantially as and for the purpose described.

3. The combination, with the box A, having the table D and opening E, of the frame B, formed with inclined surface *d*, and the mirror C, secured therein by the recess *a*, and clamping strip or bar *c*, substantially as and for the purpose specified.

In testimony that I claim the above I have hereunto subscribed my name in the presence of two witnesses.

DAVID R. McCUTCHEN.

Witnesses:
L. T. LARNED,
S. D. WEBSTER.